United States Patent
Hynes et al.

(10) Patent No.: US 7,863,567 B1
(45) Date of Patent: Jan. 4, 2011

(54) MULTIMODAL RADIATION IMAGER

(75) Inventors: Michael V. Hynes, Cambridge, MA (US); Bernard Harris, Waltham, MA (US); Eugene E. Lednum, Bolton, MA (US); Mark S. Wallace, Santa Fe, NM (US); Larry J. Schultz, Los Alamos, NM (US); David M. Palmer, Los Alamos, NM (US); Daniel T. Wakeford, Pembroke (CA); Hugh R. Andrews, Pembroke (CA); Richard C. Lanza, Brookline, MA (US); Edward T. H. Clifford, Deep River (CA); Harry Ing, Deep River (CA); Liqian Li, Deep River (CA); Andrew Hoover, Los Alamos, NM (US); Shawn R. Tornga, Los Alamos, NM (US); Richard M. Kippen, Los Alamos, NM (US)

(73) Assignee: Raytheon Company, Waltham, MA (US)

( * ) Notice: Subject to any disclaimer, the term of this patent is extended or adjusted under 35 U.S.C. 154(b) by 71 days.

(21) Appl. No.: 12/386,089

(22) Filed: Apr. 13, 2009

(51) Int. Cl.
*G01T 1/00* (2006.01)
(52) U.S. Cl. ................................. 250/336.1
(58) Field of Classification Search .............. 250/336.1, 250/370.08, 370.09; 378/87
See application file for complete search history.

(56) References Cited

U.S. PATENT DOCUMENTS

| | | | |
|---|---|---|---|
| 6,484,051 B1 * | 11/2002 | Daniel | 600/436 |
| 7,291,841 B2 | 11/2007 | Nelson et al. | 250/370.09 |
| 7,394,053 B2 | 7/2008 | Frangioni et al. | 250/208.1 |
| 2006/0108509 A1 * | 5/2006 | Frangioni et al. | 250/208.1 |
| 2008/0230707 A1 * | 9/2008 | Idoine | 250/363.06 |
| 2009/0008565 A1 | 1/2009 | Gottesman | 250/370.06 |
| 2009/0122958 A1 * | 5/2009 | Mihailescu et al. | 378/87 |

FOREIGN PATENT DOCUMENTS

WO WO 2007/147957 A1 12/2007

\* cited by examiner

*Primary Examiner*—David P Porta
*Assistant Examiner*—Marcus H Taningco
(74) *Attorney, Agent, or Firm*—Baker Botts L.L.P.

(57) ABSTRACT

According to one embodiment, generating image data includes receiving coded aperture imaging sensor data collected according to coded aperture imaging and receiving Compton imaging sensor data collected according to Compton imaging. The coded aperture imaging sensor data and the Compton imaging sensor data are generated by a sensor system sensing radiation from a radiation source. A coded aperture imaging pixel value and a Compton imaging pixel value are determined for each pixel of an image. A combining function comprising addition is applied to the coded aperture imaging pixel value and the Compton imaging pixel value to yield a combined pixel value for each pixel. Combined image data is generated from the combined pixel values. The combined image data is configured to yield a combined image of the radiation source.

20 Claims, 5 Drawing Sheets

MULTIMODAL RADIATION IMAGER

TECHNICAL FIELD

This invention relates generally to the field of imaging systems and more specifically to a multimodal radiation imager.

BACKGROUND

Radiation imaging devices may be used to locate sources of radiation. The radiation sources may be embedded in the background of normally occurring radiation. Accordingly, radiation imaging devices separate the radiation from the sources from the background radiation.

SUMMARY OF THE DISCLOSURE

In accordance with the present invention, disadvantages and problems associated with previous techniques for imaging radiation sources may be reduced or eliminated.

According to one embodiment, generating image data includes receiving coded aperture imaging sensor data collected according to coded aperture imaging and receiving Compton imaging sensor data collected according to Compton imaging. The coded aperture imaging sensor data and the Compton imaging sensor data are generated by a sensor system sensing radiation from a radiation source. A coded aperture imaging pixel value and a Compton imaging pixel value are determined for each pixel of an image. A combining function comprising addition is applied to the coded aperture imaging pixel value and the Compton imaging pixel value to yield a combined pixel value for each pixel. Combined image data is generated from the combined pixel values. The combined image data is configured to yield a combined image of the radiation source.

Certain embodiments of the invention may provide one or more technical advantages. A technical advantage of one embodiment may be that coded aperture imaging and Compton imaging may be used to generate an image of a radiation source. Another technical advantage of one embodiment may be that shadow imaging may be used to estimate the direction of a radiation source.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 6 of the drawings, like numerals being used for like and corresponding parts of the various drawings.

Figure 1:
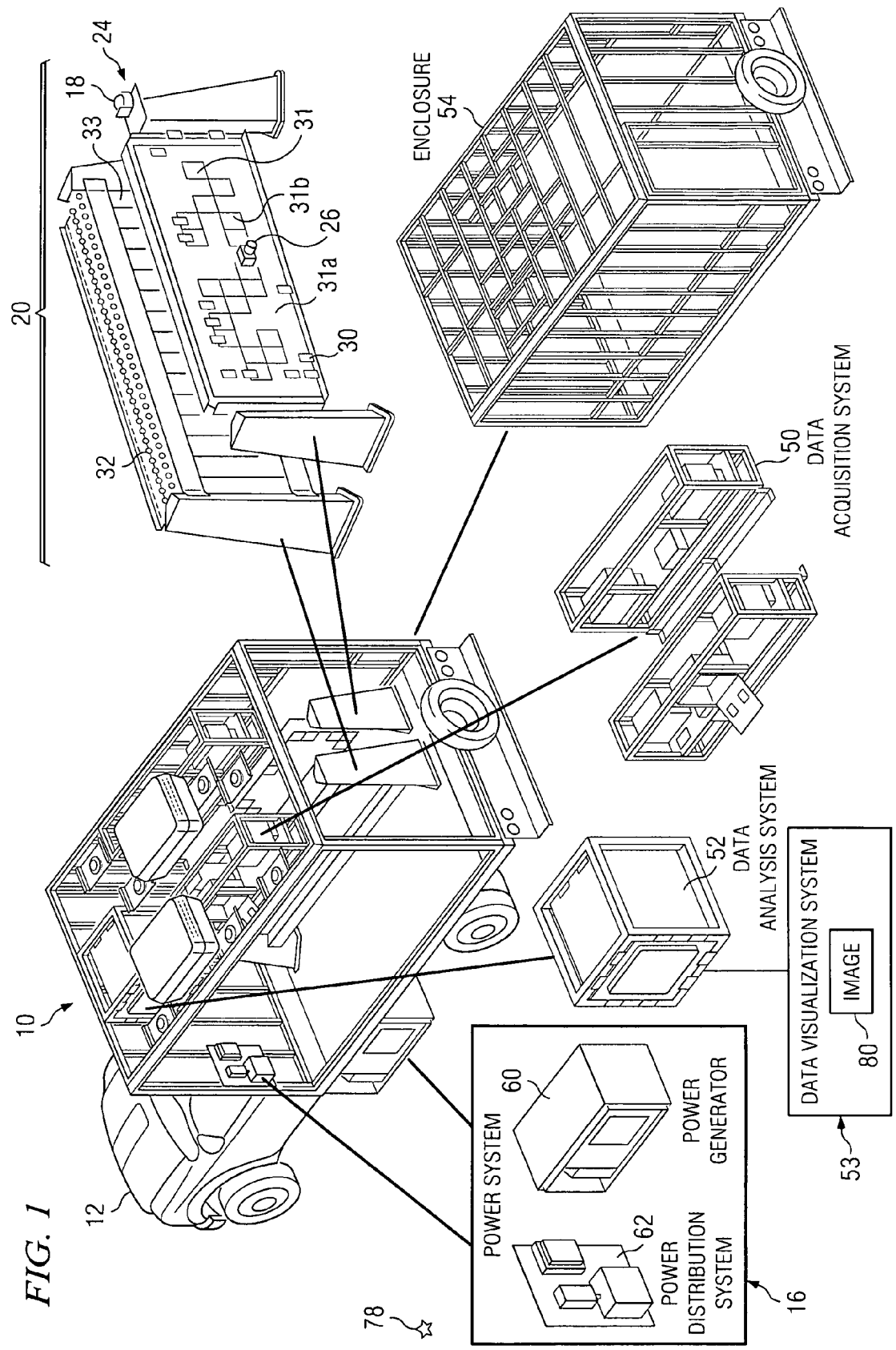
FIGS. 1 and 2 illustrate one embodiment of a system that may use multiple imaging modes to generate an image of a radiation source.
Figure 2:
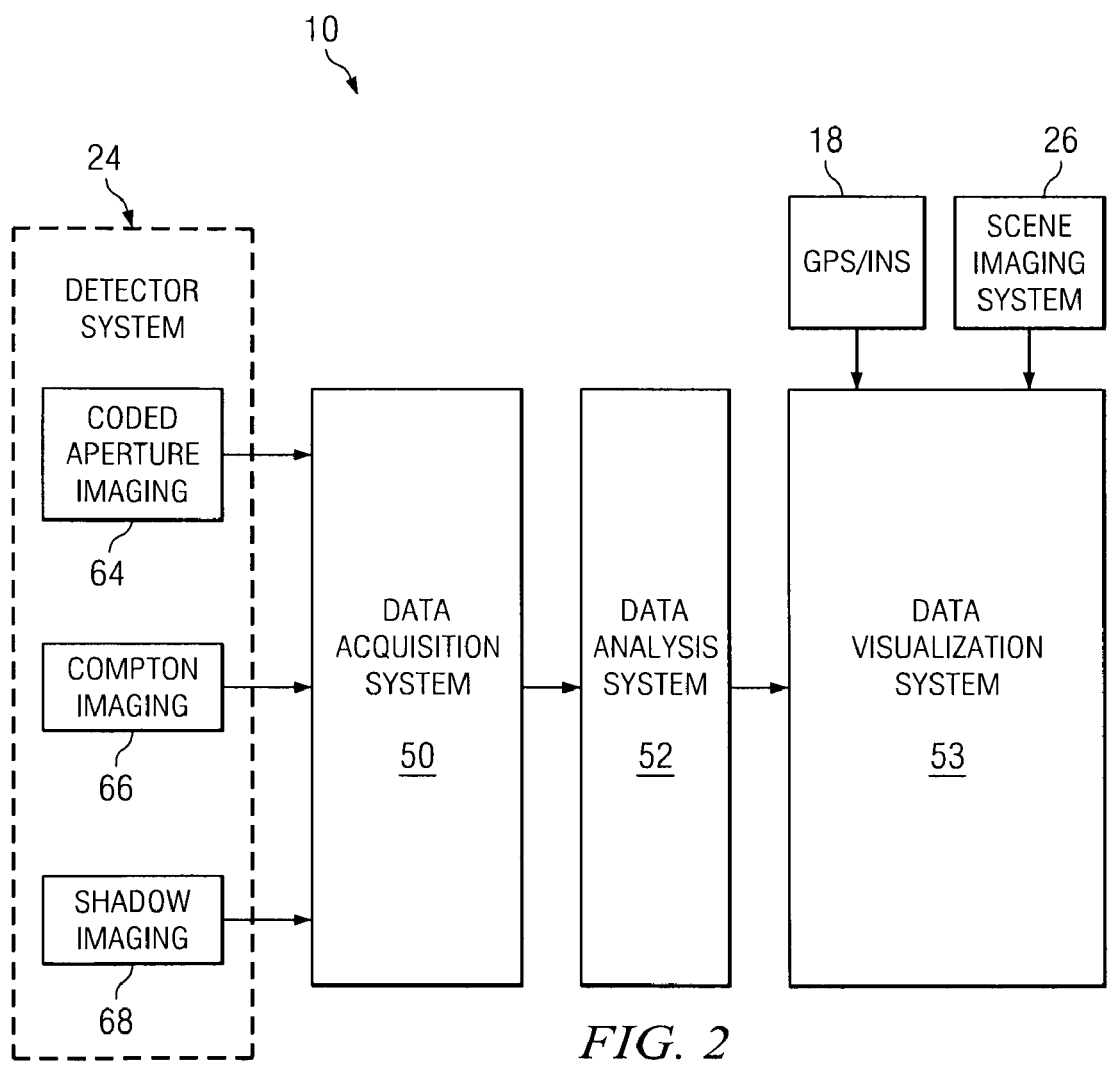

FIGS. 1 and 2 illustrate one embodiment of a system 10 that may use multiple imaging modes to generate an image 80 of a radiation source 78. FIG. 1 illustrates a perspectival view and exploded view of system 10, and FIG. 2 illustrates a functional block diagram view of system 10.

In the illustrated embodiment, system 10 includes a transport system 12, a power system 16, a global positioning system/inertial navigation system (GPS/INS) 18, sensor systems 20, a data acquisition system 50, a data analysis system 52, a data visualization system 53, and an enclosure 54 (FIG. 1). Sensor systems 20 include a detector system 24 and a scene imaging system (FIG. 1). Detector system 24 includes a front array 30 and a rear array 32 (FIG. 1) that may provide coded aperture imaging 64, Compton imaging 66, and shadow imaging 68 (FIG. 2).

Source 78 emits radiation, such as gamma radiation, that may be detected by system 10. In particular embodiments, source 78 may be a point source that emits radiation that may be difficult to distinguish from background radiation. In certain situations, source 78 may be a radiological threat, which may have an energy less than approximately 700 kiloelectron volts (keV). In other situations, source 78 may be a special nuclear materials (SNM) threat, which may be greater than approximately 500 keV.

In particular embodiments, system 10 may detect radiation emitted by source 78 and then use multiple imaging modes to generate image 80 of source 78. In particular embodiments, the modes may include a coded aperture imaging mode, a Compton imaging mode, and/or a shadow imaging mode. Coded aperture imaging and Compton imaging may be used to generate image 80 of radiation source 78. Shadow imaging may be used to estimate the direction of radiation source 78.

Transport system 12 transports one or more components of system 10, and may move system 10 relative to source 78. In certain situations, system 10 may move relative to stationary source 78, source 78 may move relative to stationary system 10, or both system 10 and source 78 may be moving or stationary.

In particular embodiments, transport system 12 may be an automobile (such as a car or truck), a marine vessel (such as a boat), or an aircraft (such as a plane). Transport system 12 may move the components of system 10 at any suitable speed, for example, a speed in the range of 0 to 60 miles per hour (mph) (such as approximately 30 mph) or greater than 60 mph. Enclosure 54 houses the components of system 10 such that they are operational even if system 10 is moving.

Power system 16 supplies and/or distributes power to one or more components of system 10. In particular embodiments, power system 16 may include a power generator 60 and a power distribution system 62.

GPS/INS 18 provides the location and/or orientation of system 10. In particular embodiments, location may be expressed in terms of longitude, latitude, and/or elevation. Orientation may be expressed in degrees with respect to an objective orientation, such as true North.

Sensor systems 22 detect radiation in a physical area to generate sensor data that may be used to generate image 80 of the physical area. In particular embodiments, sensor systems 22 include detector system 24 and scene imaging system 26.

Detector system 24 detects radiation, for example, gamma radiation, emitted from source 78 to generate sensor data.

Detector system 24 may detect radiation of any suitable energy, for example, 40 to 3000 keV. Detector system 24 may locate radiation sources 78 at any suitable distance, for example, up to 100 meters away. Detector system 24 may include front array 30 and rear array 32 that detect radiation according to coded aperture imaging and/or Compton imaging. The side on which front array 30 is located may be regarded as the coded aperture and Compton imaging side. The side on which rear array 32 is located may be regarded as the reverse Compton imaging side. The imaging modes are described in more detail with reference to FIGS. 3 and 4.

Figure 3:
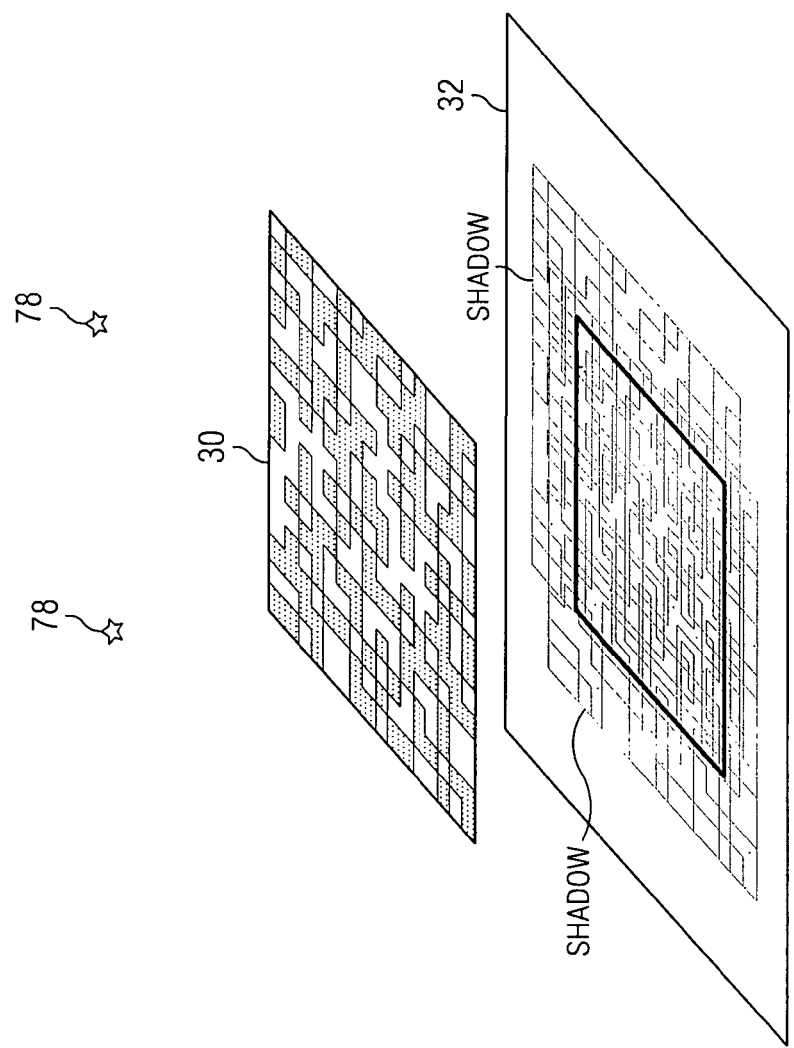
FIG. 3 illustrates one embodiment of portions of arrays performing coded aperture imaging.
Figure 3:
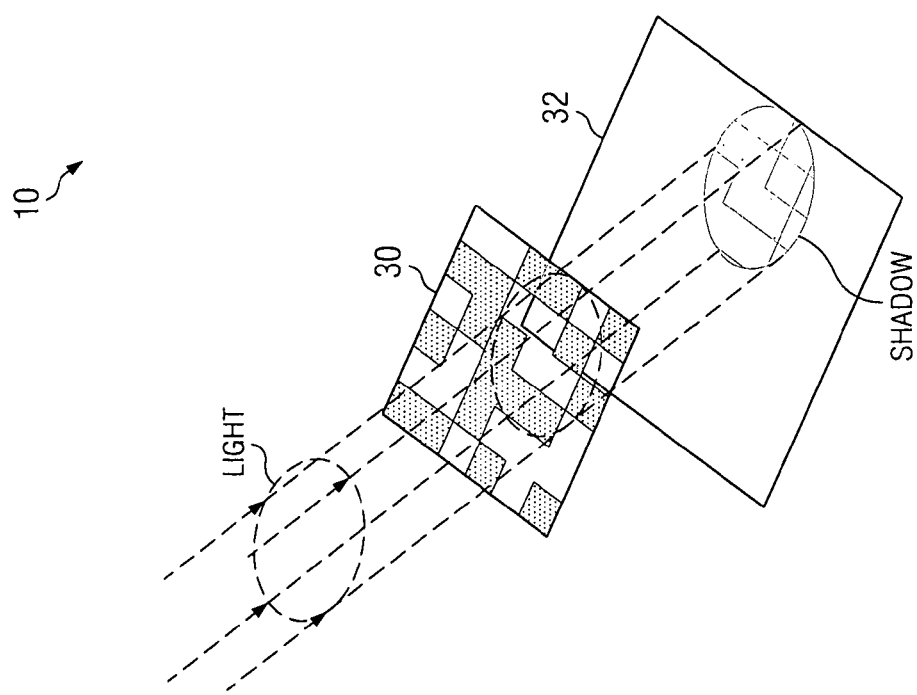

FIG. 3 illustrates one embodiment of portions of arrays 30 and 32 performing coded aperture imaging. In the illustrated embodiment, incoming light passes through apertures of front array 30 to yield a shadow pattern on rear array 32. Radiation from different sources, as well as radiation from a single source passing through different apertures, yields shadows at different positions of rear array 32. The shadow patterns are decoded to yield an image. Coded aperture imaging may more readily detect low energy gamma rays.

Figure 4:
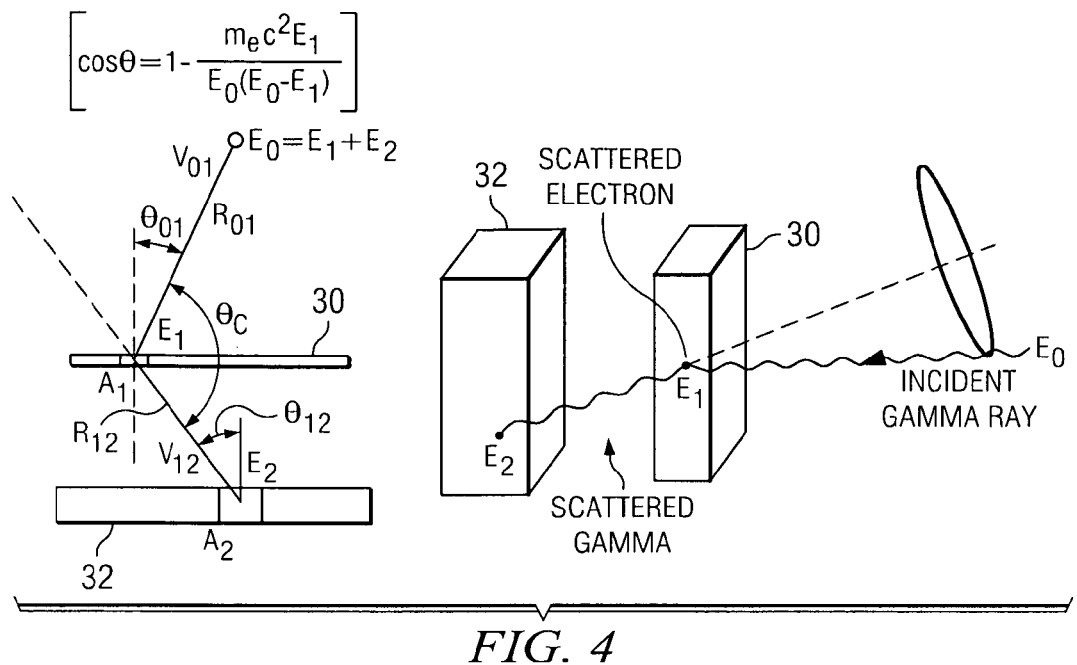
FIG. 4 illustrates one embodiment of portions of arrays performing Compton imaging.

FIG. 4 illustrates one embodiment of portions of arrays 30 and 32 performing Compton imaging. In the illustrated embodiment, arrays 30 and 32 operate as energy and position sensitive detectors. Front array 30 operates as a scattering detector, and rear array 32 operates as an absorbing detector. An incident gamma ray scatters a photon from front array 30, which is absorbed by rear array 32.

The energy and position measurements taken from arrays 30 and 32 may be used to estimate the location of source 78. The scattering angle of a photon may be calculated from the energy and position to yield a cone with a vertex at the first measurement point. A single source may generate many scattered photons, yielding many cones. The cones intersecting onto an imaging plane yield rings. The intersection of the rings may indicate the position of the source. Compton imaging may more readily detect high energy gamma rays.

Referring back to FIG. 1, in the illustrated embodiment, front array 30 serves as a mask for coded aperture and/or a first scattering plane for Compton imaging. In particular embodiments, front array 30 may be a grid with mask elements 31, which may be active or passive. A mask element (for example, element 31b) may be transparent to photons with energies between E1 and E2, or a mask element (for example, element 31a) may be opaque to the photons.

In particular embodiments, a mask element 31 may comprise a photomultiplier tube (PMT) coupled to a crystal. Any suitable crystal may be used, for example, sodium iodide (NaI), lanthanum bromide ($LaBr_3$), cerium bromide ($CeBr_3$), or cesium iodide (CsI). The crystal may be housed in a housing (for example, an aluminum housing) of any suitable thickness (for example, less than 2 millimeters, such as 1 millimeter).

Any suitable photomultiplier tube may be used, for example, a bi-alkalide photomultiplier tube. The tube may have any suitable length, for example, 3 to 5 inches, such approximately 4 inches. In particular embodiments, the photomultiplier tube may have low mass to increase the probability of Compton scattering in the NaI crystal instead of the tube. The photomultiplier tube may also have low mass bases.

The photomultiplier tube may have any suitable shielding. In particular embodiments, the photomultiplier tube may have a shielding (for example, an aluminum shield) against light and/or electromagnetic interference. In particular embodiments, the photomultiplier tube may have a magnetic shielding (for example, a cobalt alloy foil wrapped in several layers).

Mask elements 31 may be arranged on the grid in any suitable manner, such as in rectangular, hexagonal, or irregular arrangements. For example, the grid may comprise N×M mask elements 31, where N represents the rows of elements 31, and M represents the columns of the elements 31. The grid may comprise any suitable number of mask elements 31, for example, 20 to 30, 30 to 50 (such as 35 elements), or 50 or more elements. Transparent and opaque mask elements 31 may be arranged in any suitable mask pattern, such as a random, sparse, or filled pattern. The grid may be planar or curved.

Mask elements 31 may: (1) have any suitable shape, such as circular, square, rectangular, hexagonal, or other polygonal; (2) have any suitable size, such as any suitable length, width, and/or depth; (3) be coplanar or on different planes; (4) be fixed or movable with respect to each other; and (5) be substantially identical to or different from each other.

In certain embodiments, a mask element 31 may have a front side (where a photon enters) and a back side. The sides may have a height and width. The thickness may be the distance between the front side and back side. In certain embodiments, the height and width may be substantially equivalent, for example in the range of 4 to 6 inches, such as 5 inches. The thickness may be any suitable value, for example, a value in the range of 1 to inches, such as approximately 2 inches. The thickness of a mask element may be selected to account for apertures at the incident angle required by the off-axis performance and to optimize efficiency for Compton scattering.

Rear array 32 operates as a detector plane for coded aperture imaging and/or a full absorption plane for Compton imaging. Any suitable detectors 33 may be used, such as detectors 33 that include a crystal such as sodium iodide (NaI), lanthanum bromide ($LaBr_3$), cerium bromide ($CeBr_3$), or cesium iodide (CsI).

Detectors 33 may: (1) have any suitable shape, for example, cylindrical, circular, or rod-shaped; (2) have any suitable size, such as any suitable length, width, and/or depth; (3) be coplanar or on different planes; (4) be fixed or movable with respect to each other; and (5) be substantially identical to or different from each other.

In particular embodiments, detectors 33 may be rod-shaped with photomultiplier tubes at each end that produce detection signals. In the embodiments, the length may be greater than 10 inches, for example, 24 inches, and the width and depth may be approximately 2 to inches, for example, the depth of 2.5 inches and a width of 3 inches. In other embodiments, detectors 33 may be discrete elements.

In particular embodiments, detectors 33 may be mounted vertically such that the length of detectors 33 is vertical. Detectors 33 may yield a discrete event position in the horizontal axis and a continuous event position in the vertical axis. The horizontal position may be determined from which rod is active. The vertical position may be estimated from the pulse height difference between signals at the ends of the rod. The pulse height amplitude varies predictably along the length of detector 33. The controlled attenuation of light along the length of detector 33 may have a direct negative effect on the achievable energy resolution. If the attenuation is truly exponential, the position and energy may be readily calculated using the ratio and product of pulse height amplitudes, respectively.

The front array 30 and rear array 32 may be spaced any suitable distance apart. The separation may be adjusted to optimize angular resolution and minimize artifacts in the deconvolution. In certain examples, the separation may be 50 to 100 centimeters, such as approximately 75 centimeters.

The crystal center arrays may be aligned crystal center to crystal center. Arrays 30 and 32 may have any suitable field of view, which may be designated by design requirements. Certain designs may require a field of view of 45 to 90, 90 to 120, 120 or 120 to 145 degrees horizontally by 45 to 90, 90 to 120 or 120 to 145 degrees vertically, such as 1 radian vertically and 2 radians horizontally.

Detector system 24 may output a list-mode event stream of digitized sensor data that describes the energy, time, and position of events. The sensor data may also include a coincidence data tag to identify coincident events for Compton imaging.

Scene imaging system 26 detects radiation and generates scene image data of an area in which source 78 is located. The scene image data may be used to generate image 80 of the scene. Examples of scene imaging system include a visible light or infrared camera. Scene imaging system 26 may be mounted in any suitable place, such as the center of front array 30.

Data acquisition system 50 processes sensor data received from sensor systems 20 such as detector system 24. In particular embodiments, data acquisition system may collect and digitize sensor data from the photomultiplier tubes and time stamp, digitize, and/or attach orientation and/or position information to the data. Data acquisition system 50 may tag spectral events with the time of the event and the position, orientation, and speed of system 10. Data acquisition system 50 may then send the processed data to data analysis system 52.

Data analysis system 52 performs coded aperture imaging, Compton imaging, and/or shadow imaging using sensor data received from sensor systems 20 to generate image data used to form image 80. In particular embodiments, data analysis system 52 may generate image data resulting from two or more of the three modes of imaging. For example, data analysis system 52 may generate data for a combined nuclear image using coded aperture imaging and Compton imaging.

In particular embodiments, data analysis system 52 may use shadow imaging to estimate the location of source 78, even if source 78 is hidden from view. Shadow imaging may detect sources 78 in a $2\pi$ hemisphere surrounding system 10. Components of system 10 may cast gamma ray shadows on arrays 30 and/or 32. The orientation and/or size of a shadow may be used to estimate the direction of source 78. For example, array 30 or 32 may have a protrusion. A source 78 on one side of the protrusion casts a shadow on the opposite side of the protrusion. In addition, a source 78 that is higher casts a shadow that is shorter than a shadow cast by a lower source.

System 10 may be reoriented in response to the direction given by shadow imaging. For example, shadow imaging may indicate that there is a source 78 on the Compton imaging side of system 10. System 10 may then be reoriented such that the coded aperture imaging and Compton imaging side of system 10 faces source 78 to gather more information.

In particular embodiments, data analysis system 52 may characterize events. Data analysis system 52 may aggregate coincident events and determine the event types based on the hit pattern of the events. Data analysis system 52 may identify the isotopes of source 78 from the spectral signature of the radiation. Data analysis system 52 may use any other suitable information, such as the spatial extent of source 78, the activity level, the observed intensity, and/or the degree of shielding to characterize events.

Data visualization system 53 generates image 80 from sensor data and/or image data. An example of image 80 is described in more detail with reference to FIG. 5.

Figure 5:
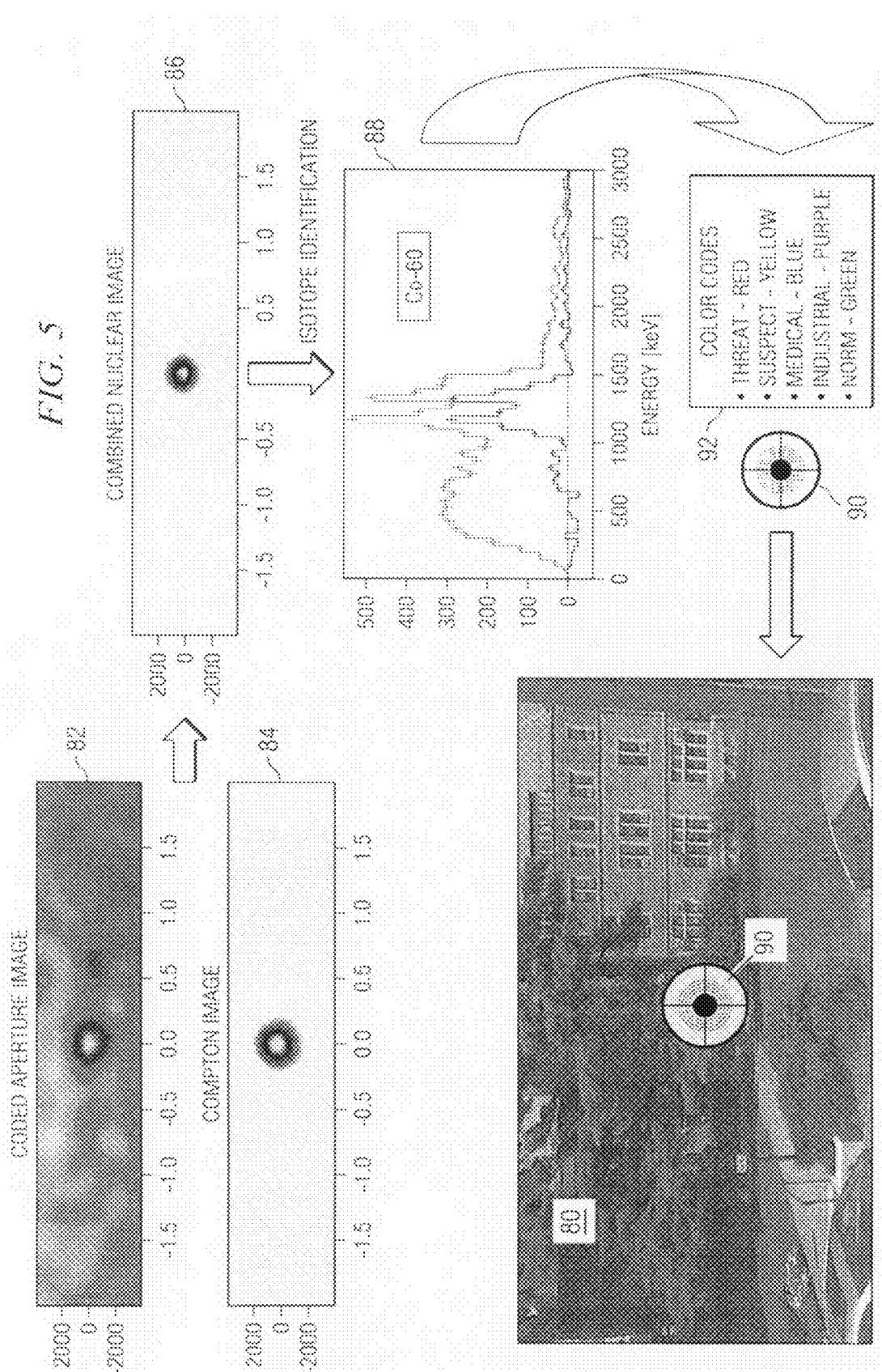
FIG. 5 illustrates an example of an image that may be generated by the system of FIGS. 1 and 2.

FIG. 5 illustrates an example of image 80 that may be generated by system 10. In the example, a coded aperture image 82 is combined with a Compton image 84 to yield a combined nuclear image 86 of a source. Coded aperture image 82 and Compton image 84 may be combined in any suitable manner. An example of a method of combing images 82 and 84 is described with reference to FIG. 6.

An isotope identification 88 identifies the isotopes of radiation source 78. Isotope identification 88 may be determined from spectral imaging of the radiation from source 78. In particular embodiments, isotope identification 88 may be used to determine a threat level for source 78 indicating how dangerous source 78 is. Certain isotopes may be classified according to certain levels of threat. For example, Ba-133, which may be used for medical purposes, may be classified as a neutral level threat.

A target indicator 90 may indicate the location, the type of threat (such as the threat level), and/or the isotope identification 88 of source 78. In particular embodiments, target indicator 90 may comprise a target overlay placed at the location of source 78 in a scene image formed from scene image data. Target indicator 90 may have a graphical feature (such as size, shape, and/or color) that indicates the type of threat and/or the isotope identification. In the illustrated example, target indicator 90 has a particular color that indicates a particular threat level, as illustrated by color codes 92.

Data visualization system 53 may correct for the relative motion between system 10 and source 78. In particular embodiments, the time and location stamping of the data may be used to correct for the relative motion. In particular embodiments, data may be binned in windows that are time shifted based on the relative velocity. For example, 10 to 30 seconds, such as 20 seconds, of data may be binned into 0.2 to 0.7 second windows, for example, 0.5 second windows. The data may be corrected and combined into a single image.

Data visualization system 53 may determine the location of source 78 and/or the distance between system and source 78 by gathering sensor data showing the movement of source 78 with respect to system 10 and objects around source 78. For example, parallax displacement between source 78 and objects may be used to determine the position of source 78 relative to the objects. As another example, the relative motion between system 10 and source 78 may appear to be greater if the distance between system 10 and source 78 is smaller, so the relative motion may be used to determine the distance.

Referring back to FIG. 1, a component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/ or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Figure 6:
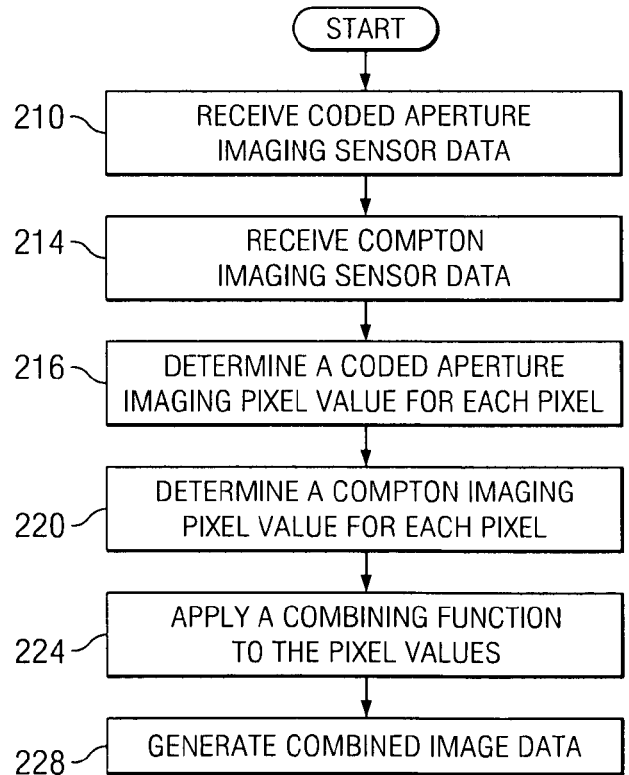
FIG. 6 illustrates an example of a method for combining coded aperture imaging and Compton imaging that may be performed by the system of FIGS. 1 and 2.

FIG. 6 illustrates an example of a method for combining coded aperture imaging and Compton imaging that may be performed by system 10. Coded aperture imaging sensor data is received at step 210. The coded aperture imaging sensor data is collected according to coded aperture imaging by sensor system 20 sensing radiation from radiation source 78. Compton imaging sensor data is received at step 214. The Compton imaging sensor data is collected according to Compton imaging sensor system 20 sensing the radiation from radiation source 78.

A coded aperture imaging pixel value is determined for each pixel of a plurality of pixels of image 80 at step 216. In coded aperture imaging, the measurements comprise counts at particular positions measured at rear array 32. The counts may be expressed as $Y_i$, $i=1, \ldots, N_{CA}$, where $N_{CA}$ represents a number of coded aperture spatial bins. The resulting image 80 may have M pixels $x_j$, $j=1, \ldots, M$, where $x_j$ represents the count rate emitted from the jth pixel.

To model the connection between source activity and detector counts, counts $Y_i$ may be assumed to be Poisson distributed with a mean number of counts given by Equation (1):

$$\bar{Y}_i = T \sum_j (\omega_{ij} s_j x_j) \quad (1)$$

where T represents exposure time, $s_j$ represents a relative sensitivity of the detectors to a photon emitted from the jth pixel, and $w_{ij}$ represents a relative probability that a detected photon emitted from the jth pixel is detected in the ith detector bin.

The relative sensitivity $s_j$ may be predominantly a function of a solid angle, where system 10 is less sensitive to photons emitted from more distant and off-axis locations. The relative probability $w_{ij}$ represents the mask pattern, where $w_{ij}=0$ if the jth pixel is masked from the ith detector bin, and $\omega_{ij}=1/\Sigma_k(\omega_{kj})$ if the pixel is unmasked. The weight may be between these two limits if the pixel is partially masked.

At the nth iteration, a new image estimate of a coded aperture imaging pixel value may be given according to the update equation given by Equation (2):

$$x_j^{(n)} = x_j^{(n-1)} \sum_i \left( \omega_{ij} \frac{Y_i}{\bar{Y}_i(n-1)} \right) \quad (2)$$

A Compton imaging pixel value is determined for each pixel of the plurality of pixels at step 220. Compton imaging events $y_k$, $k=1, \ldots, N_{CP}$, may be defined by the measurements $(E_1, E_2, A_1, A_2)_k$ for the kth event, where $E_1, E_2, A_1$, and $A_2$ are shown in FIG. 2. The probability of the kth event may be defined using Equation (3):

$$\bar{y}_k = T \sum_j (v_{kj} t_j x_j) \quad (3)$$

where $t_j$ represents the relative sensitivity of the detector system to Compton events emitted from the jth pixel, and $v_{kg}$ represents the relative probability that the kth Compton event could have been emitted from the jth image pixel. Relative sensitivity $t_j$ may be analogous to the relative sensitivity $s_j$ for coded aperture imaging, but may have different values. Relative probability $v_{kj}$ may represent the Compton cones projected into image space.

The update equation for the Compton imaging pixel value may be described by Equation (4):

$$x_j^{(n)} = x_j^{(n-1)} \sum_k \left( v_{kj} \frac{1}{\bar{y}_k^{(n-1)}} \right) \quad (4)$$

A combining function is applied to the coded aperture imaging pixel value and the Compton imaging pixel value to yield a combined pixel value for each pixel of the plurality of pixels at step 224. The combined update function may be expressed by Equation (5):

$$x_j^{(n)} = x_j^{(n-1)} \left[ \sum_i \left( \omega_{ij} \frac{Y_i}{\bar{Y}_i^{(n-1)}} \right) + \beta \sum_k \left( v_{kj} \frac{1}{\bar{y}_k^{(n-1)}} \right) \right] \quad (5)$$

where β represents the strength of Compton imaging likelihood influence relative to that of coded aperture imaging. Strength β may have any suitable value, for example, 1. In particular embodiments, strength p may be energy dependent, that is, strength β may weight the influence according to energy. For example, β may closer to zero or zero for lower energies and closer to one or one for higher energies.

In particular embodiments, modalities may be combined using techniques other than the one described above. As an example, the modalities may be combined using joint maximum likelihood. As another example, the modalities may be combined using joint model fits, which is an extension of joint maximum likelihood. Joint model fits utilizes the position and energy response of the individual modalities, and incorporates an additional likelihood function based on the energy compared to the energies of known sources.

In particular embodiments, modalities may be combined using data from multiple positions and aspects. For example, indices i and k from above may incorporate energy and time and/or relative motion. Index j may incorporate energy and three spatial dimensions. With motion, the image can be expressed in voxels, not just planar pixels.

Combined image data comprising the combined pixel value for the plurality of pixels is generated at step 228. The combined image data is configured to yield a combined image 86 of radiation source 78.

Modifications, additions, or omissions may be made to the systems described in this disclosure without departing from the scope of the invention. The components of the systems may be integrated or separated. Moreover, the operations of the systems may be performed by more, fewer, or other components. For example, the operations of data acquisition system 50 and data analysis system 52 may be performed by one component, or the operations of data analysis system 52 may be performed by more than one component. Additionally, operations of the systems may be performed using any suitable logic comprising software, hardware, and/or other logic. As used in this document, "each" refers to each member of a set or each member of a subset of a set.

Modifications, additions, or omissions may be made to the methods described in this disclosure without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   receiving coded aperture imaging sensor data collected according to coded aperture imaging, the coded aperture imaging sensor data generated by a sensor system sensing radiation from a radiation source;
   receiving Compton imaging sensor data collected according to Compton imaging, the Compton imaging sensor data generated by the sensor system sensing the radiation from the radiation source;
   determining a coded aperture imaging pixel value for each pixel of a plurality of pixels of an image;
   determining a Compton imaging pixel value for each pixel of the plurality of pixels;
   applying a combining function to the coded aperture imaging pixel value and the Compton imaging pixel value to yield a combined pixel value for each pixel of the plurality of pixels, the combining function comprising addition; and
   generating combined image data from the combined pixel values for the plurality of pixels, the combined image data configured to yield a combined image of the radiation source.

2. The method of claim 1, the applying the combining function comprising:
   adding the coded aperture imaging pixel value and the Compton imaging pixel value for each pixel.

3. The method of claim 1, the applying the combining function comprising:
   weighting the Compton imaging pixel value for each pixel according to a source energy; and
   adding the coded aperture imaging pixel value and the weighted Compton imaging pixel value for each pixel.

4. The method of claim 1, further comprising:
   determining an orientation of a shadow on the sensor system cast by the radiation; and
   calculating a direction of the radiation source according to shadow imaging applied to the orientation.

5. The method of claim 1, further comprising:
   generating scene image data configured to yield an image of a scene in which the radiation source is located; and
   indicating a location of radiation source within the image of the scene.

6. The method of claim 1:
   the sensor system moving with respect to the radiation source; and
   the method further comprising:
      gathering sensor data of the radiation source with respect to a scene in which the radiation source is located, the sensor data gathered as the sensor system moves with respect to the radiation source; and
      determining a location of the radiation source from the gathered sensor data.

7. The method of claim 1, further comprising:
   determining an isotope identification of the radiation source; and
   indicating the isotope identification on a scene image that includes the radiation source.

8. The method of claim 1, further comprising:
   determining a threat level of the radiation source; and
   indicating the threat level on a scene image that includes the radiation source.

9. An apparatus comprising:
   a memory configured to:
      store coded aperture imaging sensor data collected according to coded aperture imaging, the coded aperture imaging sensor data generated by a sensor system sensing radiation from a radiation source;
      store Compton imaging sensor data collected according to Compton imaging, the Compton imaging sensor data generated by the sensor system sensing the radiation from the radiation source; and
   a processor configured to:
      determine a coded aperture imaging pixel value for each pixel of a plurality of pixels of an image;
      determine a Compton imaging pixel value for each pixel of the plurality of pixels;
      apply a combining function to the coded aperture imaging pixel value and the Compton imaging pixel value to yield a combined pixel value for each pixel of the plurality of pixels, the combining function comprising addition; and
      generate combined image data from the combined pixel values for the plurality of pixels, the combined image data configured to yield a combined image of the radiation source.

10. The apparatus of claim 9, the processor further configured to apply the combining function by:
    adding the coded aperture imaging pixel value and the Compton imaging pixel value for each pixel.

11. The apparatus of claim 9, the processor further configured to apply the combining function by:
    weighting the Compton imaging pixel value for each pixel according to a source energy; and
    adding the coded aperture imaging pixel value and the weighted Compton imaging pixel value for each pixel.

12. The apparatus of claim 9, the processor further configured to:
    determine an orientation of a shadow on the sensor system cast by the radiation; and
    calculate a direction of the radiation source according to shadow imaging applied to the orientation.

13. The apparatus of claim 9, the processor further configured to:
    generate scene image data configured to yield an image of a scene in which the radiation source is located; and
    indicate a location of radiation source within the image of the scene.

14. The apparatus of claim 9:
    the sensor system moving with respect to the radiation source; and
    the processor further configured to;
       gather sensor data of the radiation source with respect to a scene in which the radiation source is located, the sensor data gathered as the sensor system moves with respect to the radiation source; and determine a location of the radiation source from the gathered sensor data.

15. The apparatus of claim 9, the processor further configured to:

determine an isotope identification of the radiation source; and indicate the isotope identification on a scene image that includes the radiation source.

16. The apparatus of claim 9, the processor further configured to:

determine a threat level of the radiation source; and indicate the threat level on a scene image that includes the radiation source.

17. An apparatus comprising:

a memory configured to:

store coded aperture imaging sensor data collected according to coded aperture imaging, the coded aperture imaging sensor data generated by a sensor system sensing radiation from a radiation source;

store Compton imaging sensor data collected according to Compton imaging, the Compton imaging sensor data generated by the sensor system sensing the radiation from the radiation source; and a processor configured to:

determine a coded aperture imaging pixel value for each pixel of a plurality of pixels of an image;

determine a Compton imaging pixel value for each pixel of the plurality of pixels;

apply a combining function to the coded aperture imaging pixel value and the Compton imaging pixel value to yield a combined pixel value for each pixel of the plurality of pixels by:

weighting the Compton imaging pixel value for each pixel according to a source energy; and adding the coded aperture imaging pixel value and the weighted Compton imaging pixel value for each pixel; and generate combined image data from the combined pixel values for the plurality of pixels, the combined image data configured to yield a combined image of the radiation source.

18. The apparatus of claim 17, the processor further configured to:

determine an orientation of a shadow on the sensor system cast by the radiation; and calculate a direction of the radiation source according to shadow imaging applied to the orientation.

19. The apparatus of claim 17, the processor further configured to:

generate scene image data configured to yield an image of a scene in which the radiation source is located; and indicate a location of radiation source within the image of the scene.

20. The apparatus of claim 17:

the sensor system moving with respect to the radiation source; and the processor further configured to;

gather sensor data of the radiation source with respect to a scene in which the radiation source is located, the sensor data gathered as the sensor system moves with respect to the radiation source; and determine a location of the radiation source from the gathered sensor data.

* * * * *